United States Patent
Zeng et al.

(10) Patent No.: US 11,694,307 B2
(45) Date of Patent: Jul. 4, 2023

(54) IMAGE ENHANCEMENT SYSTEM AND METHOD BASED ON GENERATIVE ADVERSARIAL NETWORK (GAN) MODEL

(71) Applicant: Huajie Zeng, Ningbo (CN)

(72) Inventors: Huajie Zeng, Ningbo (CN); Yixiang Fang, Ningbo (CN)

(73) Assignee: Huajie Zeng, Ningbo (CN)

( * ) Notice: Subject to any disclaimer, the term of this patent is extended or adjusted under 35 U.S.C. 154(b) by 0 days.

(21) Appl. No.: 17/830,826

(22) Filed: Jun. 2, 2022

(65) Prior Publication Data

US 2022/0292642 A1  Sep. 15, 2022

Related U.S. Application Data

(63) Continuation of application No. PCT/CN2022/079267, filed on Mar. 4, 2022.

(30) Foreign Application Priority Data

Feb. 28, 2022 (CN) .......................... 202210193152.2

(51) Int. Cl.
G06T 5/00 (2006.01)
G06T 5/50 (2006.01)
G06V 10/764 (2022.01)
G06V 20/58 (2022.01)
G06V 10/774 (2022.01)

(52) U.S. Cl.
CPC .............. *G06T 5/001* (2013.01); *G06T 5/50* (2013.01); *G06V 10/764* (2022.01); *G06V 10/774* (2022.01); *G06V 20/582* (2022.01); *G06T 2207/20081* (2013.01); *G06T 2207/20084* (2013.01); *G06T 2207/30252* (2013.01)

(58) Field of Classification Search
CPC . G06T 5/001; G06T 5/50; G06T 2207/20081; G06T 2207/20084; G06T 2207/30252; G06T 5/005; G06T 5/009; G06T 5/003; G06V 10/764; G06V 10/774; G06V 20/582; G06V 10/82
See application file for complete search history.

(56) References Cited

U.S. PATENT DOCUMENTS 10,624,558 B2 * 4/2020 Ceccaldi ................ A61B 5/055
2020/0349677 A1 * 11/2020 Lee ......................... G06N 3/045
(Continued)

FOREIGN PATENT DOCUMENTS

| CN | 106740708 A | 5/2017 |
| CN | 110163235 A | 8/2019 |
| CN | 110570358 A | 12/2019 |

(Continued)

*Primary Examiner* — Ping Y Hsieh

(57) ABSTRACT

An image enhancement system and method based on a generative adversarial network (GAN) model. The image enhancement system includes an acquiring unit, a training unit and an enhancement unit. The acquiring unit is configured to acquire a first image of a driving environment captured by a camera of a first vehicle and a second image of the driving environment captured by a camera of a second vehicle. The training unit is configured to train a GAN by using the first training image to obtain an image enhancement model. The enhancement unit is configured to enhance the second image by inputting the second image into the image enhancement model.

9 Claims, 9 Drawing Sheets

(56) References Cited

U.S. PATENT DOCUMENTS

2021/0158570 A1* 5/2021 Mohandoss .......... H04N 1/6052
2022/0150380 A1* 5/2022 Machii .................... G06N 3/08

FOREIGN PATENT DOCUMENTS

| CN | 110807740 A | 2/2020 |
| CN | 113496472 A | 10/2021 |
| CN | 114037053 A | 2/2022 |
| WO | 2021133847 A1 | 7/2021 |

* cited by examiner

Acquiring a first image of a driving environment captured by a camera 20 of a first vehicle

Acquiring a training image based on the first image, wherein the training image comprises a first training image and a second training image, and an image quality of the second training image is lower than that of the first training image

Training a discriminative model in the GAN model using the first training image and the second training image

Training a generative model of the GAN model using the second training image based on a trained discriminative model to obtain an image enhancement model

Acquiring a second image of the driving environment captured by a camera 20 of a second vehicle

Inputting the second image into the image enhancement model to improve an image quality of the second image

FIG. 9

IMAGE ENHANCEMENT SYSTEM AND METHOD BASED ON GENERATIVE ADVERSARIAL NETWORK (GAN) MODEL

CROSS-REFERENCE TO RELATED APPLICATIONS

This application is a continuation of International Patent Application No. PCT/CN2022/079267, filed on Mar. 4, 2022, which claims the benefit of priority from Chinese Patent Application No. 202210193152.2, filed on Feb. 28, 2022. The content of the aforementioned applications, including any intervening amendments thereto, is incorporated herein by reference in its entirety.

TECHNICAL FIELD

The disclosure relates to image processing, and more particularly to an image enhancement system and method based on a generative adversarial network (GAN) model.

BACKGROUND

In recent years, self-driving is developed and achieved by many vehicles as a basic function. Although hardware such as light detection and ranging (LIDAR) is helpful in improving a safety and reliability of self-driving, a basic hardware for self-driving is still camera, specifically, vehicles require a camera to capture images to achieve self-driving. Compared to other smart devices, vehicles with self-driving have more demanding requirements for a final imaging of the camera. It is well known that the final imaging is not only affected by the hardware of the camera, but also by a driving environment of the vehicle. For example, for a camera of a vehicle, a final imaging in a well-lit environment is significantly better than that in a poorly-lit environment. Nevertheless, vehicles will be used in complex light environment, such as day, night, rain and fog days. Therefore, it is crucial to ensure that camera of vehicle can get a clear final image in a variety of complex lighting environments for the safety and reliability of self-driving.

SUMMARY

An object of the present disclosure is to provide an image enhancement system and method based on a generative adversarial network (GAN) model. The image enhancement system is configured to obtain an image enhancement model based on a GAN to enhance an image captured by a camera of vehicle, so as to improve an image quality.

The image enhancement system is configured to train the GAN the images captured by the camera, such that an accuracy of the image enhancement model is improved, therefore the image has higher image quality.

The image enhancement system is configured to train the GAN and enhance the images at a cloud processor, enabling a training effect of the image enhancement model frees from hardware devices that the vehicle can carry, thereby facilitating a training of a more accurate image enhancement model.

The image enhancement system is configured to improve the image captured by the camera using physical means. For example, the image enhancement system can clean a surface of the camera to remove adhesions, thus improving image quality.

In a first aspect, the present disclosure provides an image enhancement system based on a GAN model, comprising:

an acquiring unit;
a training unit; and
an enhancement unit;
wherein the acquiring unit is configured to acquire a first image of a driving environment captured by a camera of a first vehicle and a second image of the driving environment captured by a camera of a second vehicle;
the training unit is configured to acquire a training image based on the first image, wherein the training image comprises a first training image and a second training image, and an image quality of the second training image is lower than that of the first training image; configured to train a discriminative model in the GAN model by using the first training image and the second training image; and configured to train a generative model of the GAN model by using the second training image through a trained discriminative model to obtain an image enhancement model; and the enhancement unit is configured to enhance the second image by inputting the second image into the image enhancement model, so as to improve an image quality of the second image.

In some embodiments, the training unit comprises a processing module, a discriminative model training module and a generative model training module;
the processing module is configured to process the first image to obtain the first training image and the second training image;
the discriminative model training module is configured to train the discriminative model by using the first training image and the second training image; and
the generative model training module is configured to train the generative model by using the second training image based on the trained discriminative model to obtain the image enhancement model.

In some embodiments, the processing module is configured to classify the first image to obtain the first training image and the second training image.

In some embodiments, the processing module is configured to retain the first image to acquire the first training image and reduce an image quality of the first image to acquire the second training image.

In some embodiments, the image enhancement system further comprises a communication unit;
wherein the communication unit is configured to establish a communication of the first vehicle and the second vehicle with a cloud processor.

In some embodiments, the generative model training module comprises an output sub-module, a feature extraction sub-module, a comparison sub-module and a training sub-module;
the output sub-module is configured to output an output image after the second training image is input into the generative model;
the feature extraction sub-module is configured to extract a feature from feature areas of a desired image, the second training image and the output image;
the comparison sub-module is configured to obtain a brightness difference of a specific area between the second training image and the output image, and obtain a texture difference of the specific area between the desired image and the output image; and
the training sub-module is configured to train the generative model according to the brightness difference and the texture difference to obtain the image enhancement model.

In some embodiments, the specific area is an area corresponding to a road sign.

In some embodiments, the image enhancement system further comprises a control unit;

wherein the control unit is configured to control an operating state of the camera of the second vehicle, so as to remove adhesions on a surface of the camera of the second vehicle.

In some embodiments, the camera of the second vehicle comprises a camera device and a cleaning device; the cleaning device is arranged close to the camera device; the control unit is configured to control the cleaning device to remove adhesions on the surface of the camera of the second vehicle.

In a second aspect, the present disclosure provides an image enhancement method based on a GAN model, comprising:

(a) acquiring a first image of a driving environment captured by a camera of a first vehicle;

(b) acquiring a training image based on the first image, wherein the training image comprises a first training image and a second training image, and an image quality of the second training image is lower than that of the first training image;

(c) training a discriminative model in the GAN model using the first training image and the second training image;

(d) training a generative model of the GAN model using the second training image based on a trained discriminative model to obtain an image enhancement model;

(e) acquiring a second image of the driving environment captured by a camera of a second vehicle; and (f) inputting the second image into the image enhancement model to improve an image quality of the second image.

In some embodiments, in the step (b), the first training image and the second training image are acquired by classifying the first image.

In some embodiments, in the step (b), the first training image is acquired by retaining the first image; and the second training image is acquired by reducing an image quality of the first image.

In some embodiments, the GAN model is trained by a cloud processor to obtain the image enhancement model.

In some embodiments, the step (d) is performed through steps of:

(d.1) acquiring a desired image;

(d.2) inputting the second training image into the generative model of the GAN model to obtain an output image;

(d.3) obtaining a brightness difference of a specific area between the second training image and the output image;

(d.4) obtaining a texture difference of the specific area between the desired image and the output image; and (d.5) training the generative model according to the brightness difference and the texture difference to obtain the image enhancement model.

In some embodiments, the specific area is an area corresponding to a road sign.

In some embodiments, the image enhancement method further comprises:

removing adhesions on a surface of the camera of the second vehicle.

BRIEF DESCRIPTION OF THE DRAWINGS

In order to clearly illustrate the objects, features and benefits of the present disclosure, the embodiments will be described below in detail with reference to appended drawings. It should be noted that the appended drawings are merely illustrative of the present disclosure, and not intended to limit the present disclosure. In the accompanying drawings, same reference marks represent same parts or steps.

FIG. 9 is a flow chart of the image enhancement system according to an embodiment of the present disclosure.

DETAILED DESCRIPTION OF EMBODIMENTS

The embodiments of this application will be described in detail below with reference to the accompanying drawings, and it should be understood that these embodiments are not intended to limit the scope of the disclosure. Unless otherwise specified, terms "comprise", "include", "mount", "connect", "support", "couple" or variations thereof should be understood as including the mentioned elements or components, but not excluding other elements or other components. In addition, "connect" and "couple" are not limited to physical or mechanical connection or coupling.

It should be noted that directional indications, such as up, down, left, right, front and back, used herein are merely intended to explain a relative positional relationship and movement between components in a specific posture, and if the specific posture changes, the directional indication changes accordingly. In addition, term "a" may explicitly or implicitly include at least one of the element.

An image enhancement system will be described below. Referring to FIGS. 1-8, the image enhancement system is applied to a vehicle 2000. The vehicle 2000 includes a vehicle body 10 and multiple cameras 20 arranged at the vehicle body 10. The cameras 20 are configured to take images of a driving environment of the vehicle 2000. The image enhancement system is configured to enhance the images taken by the cameras 20 of the vehicle 2000 to improve an image quality.

The image enhancement system is an execution of a program stored in a memory of a computing device 3000 by a processor of the computing device 3000. In an embodiment, the computing device 3000 is communicatively connected to the vehicle 2000 via a cloud 1000, that is, the vehicle 2000 is provided with a communication unit to communicatively connect to the cloud 1000, such that the computing device 3000 forms a cloud processor. In an embodiment, the computing device 3000 is arranged at the vehicle 2000, i.e., the computing device 3000 is arranged at the vehicle body 10.

Figure 1:
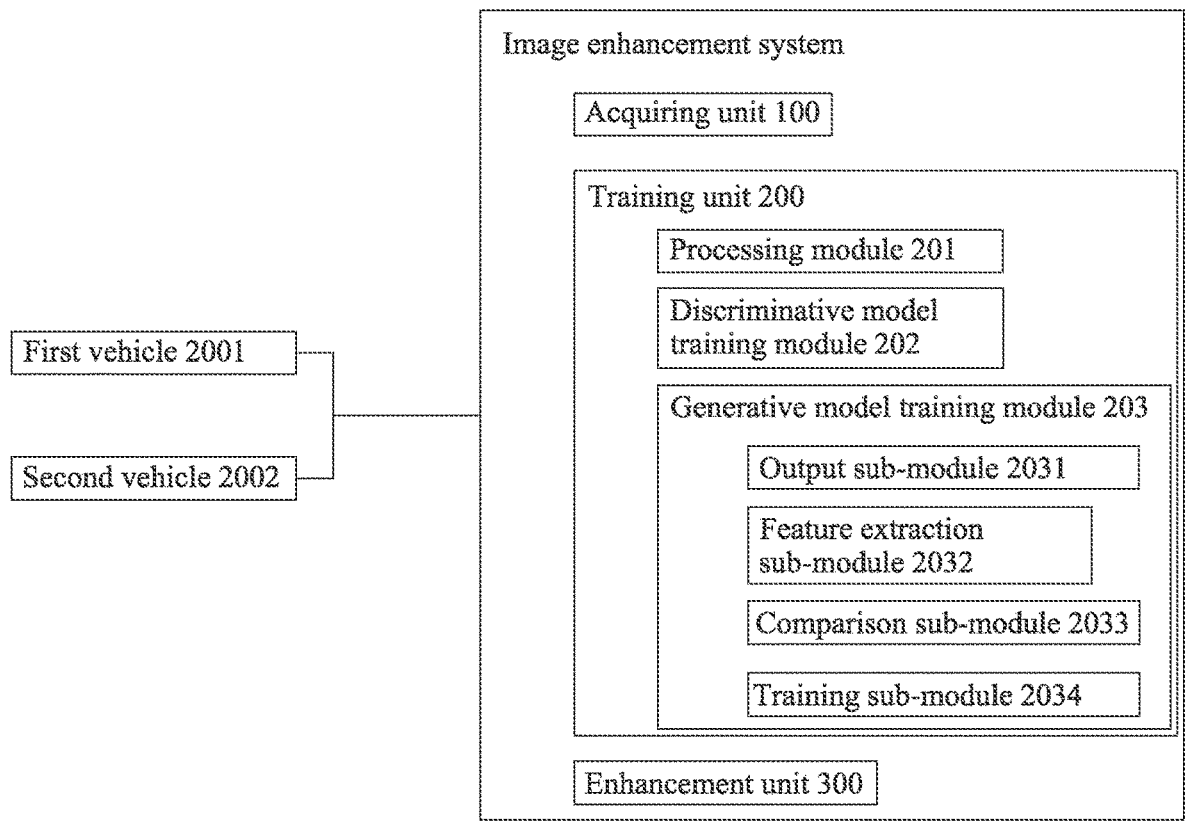
FIG. 1 schematically depicts an image enhancement system according to an embodiment of the present disclosure.
Figure 2:
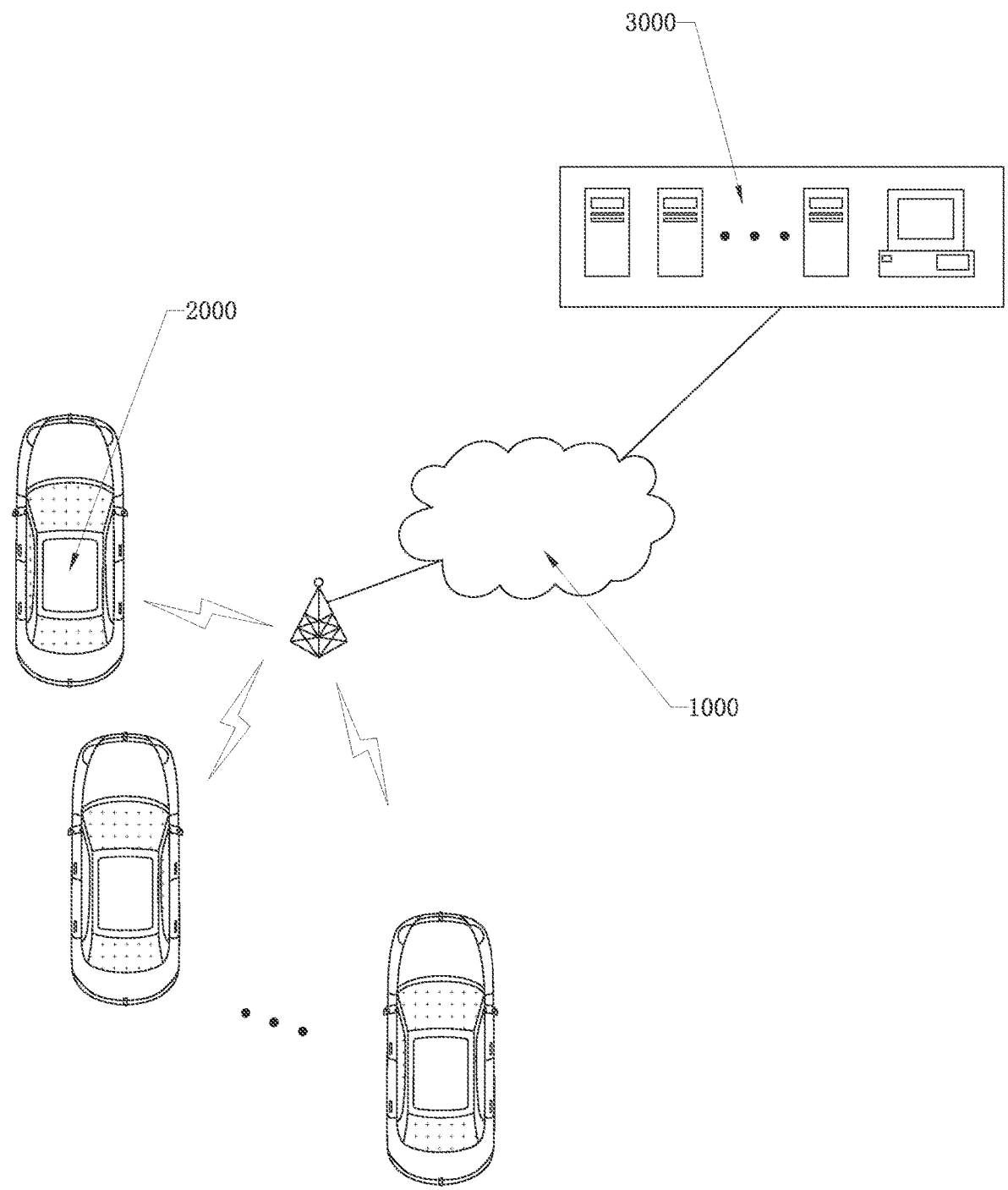
FIG. 2 schematically depicts an operating state of the image enhancement system according to an embodiment of the present disclosure.
Figure 3:
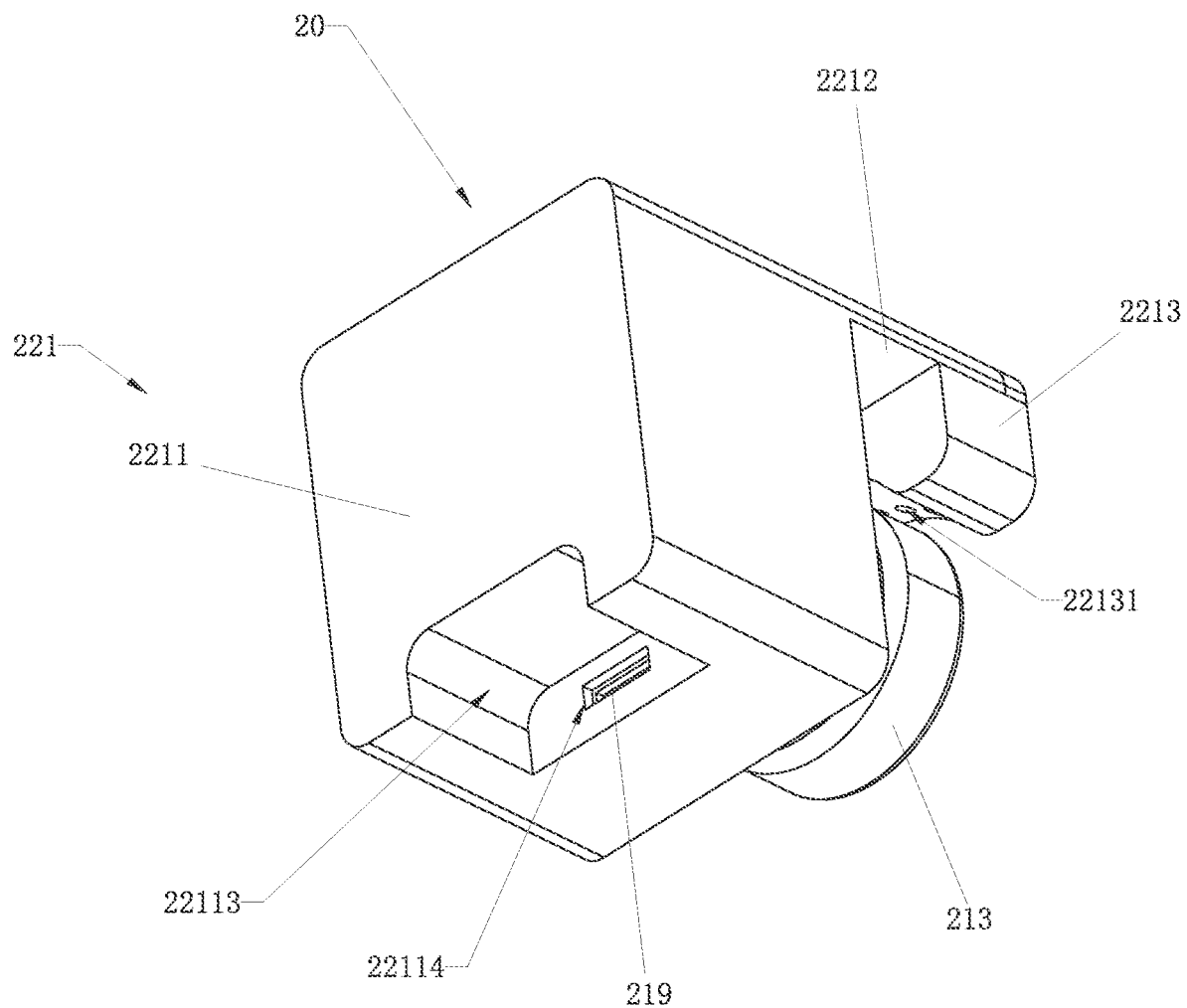
FIG. 3 is a perspective view of a camera of a vehicle with the image enhancement system according to an embodiment of the present disclosure.
Figure 4:
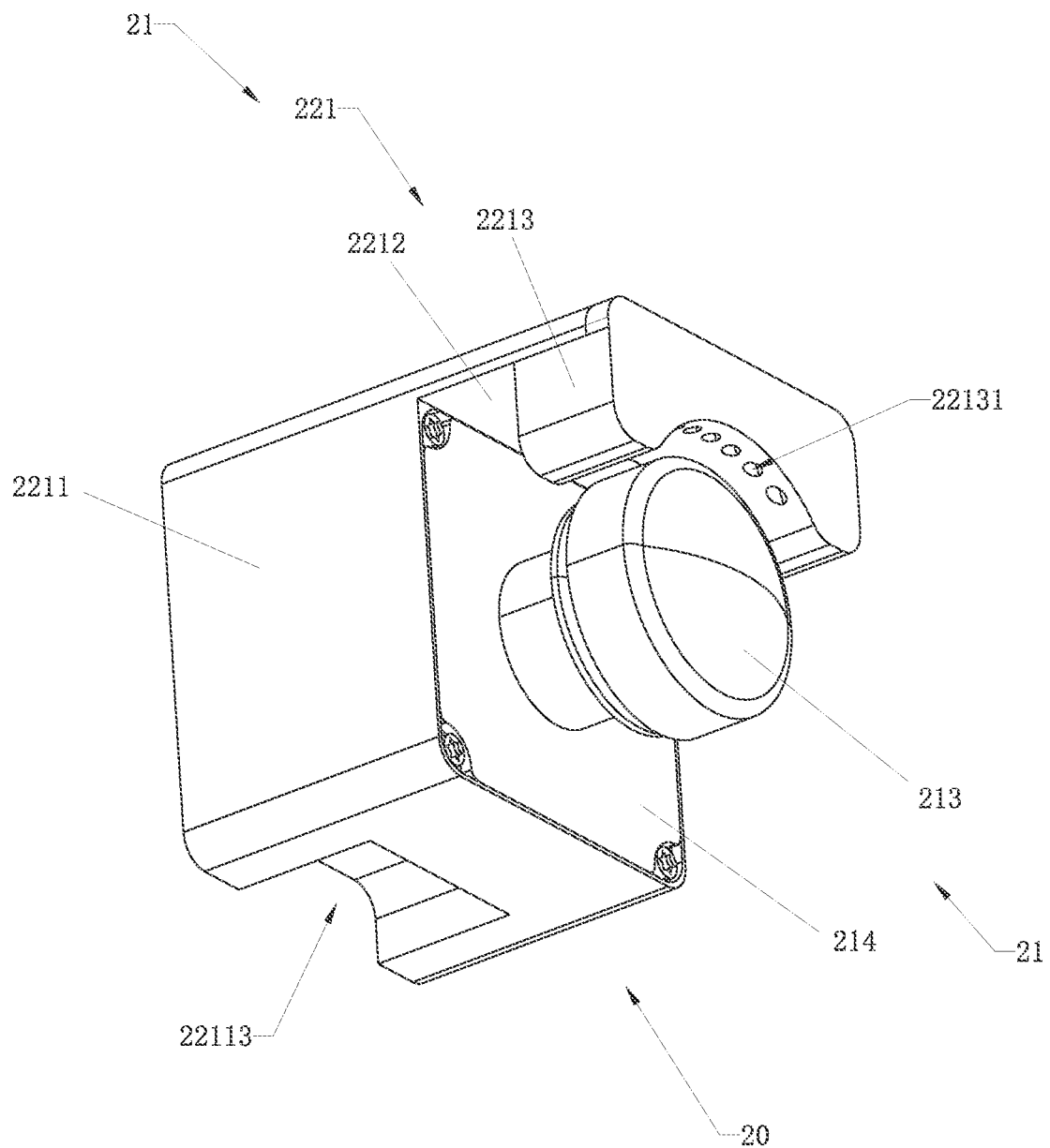
FIG. 4 is a perspective view of the camera of the vehicle with the image enhancement system according to an embodiment of the present disclosure from another perspective.
Figure 5:
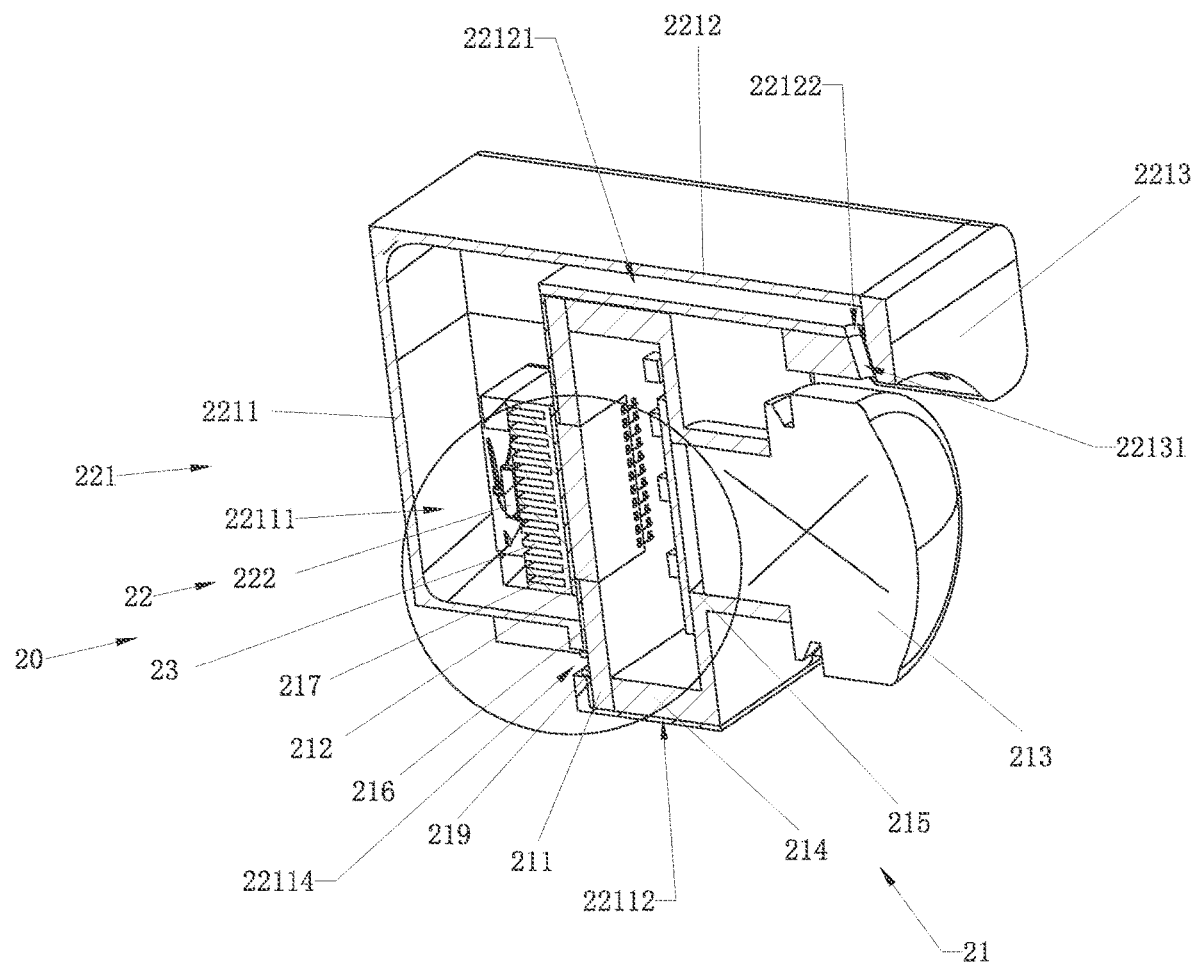
FIG. 5 is a sectional view of the camera of the vehicle with the image enhancement system.
Figure 6:
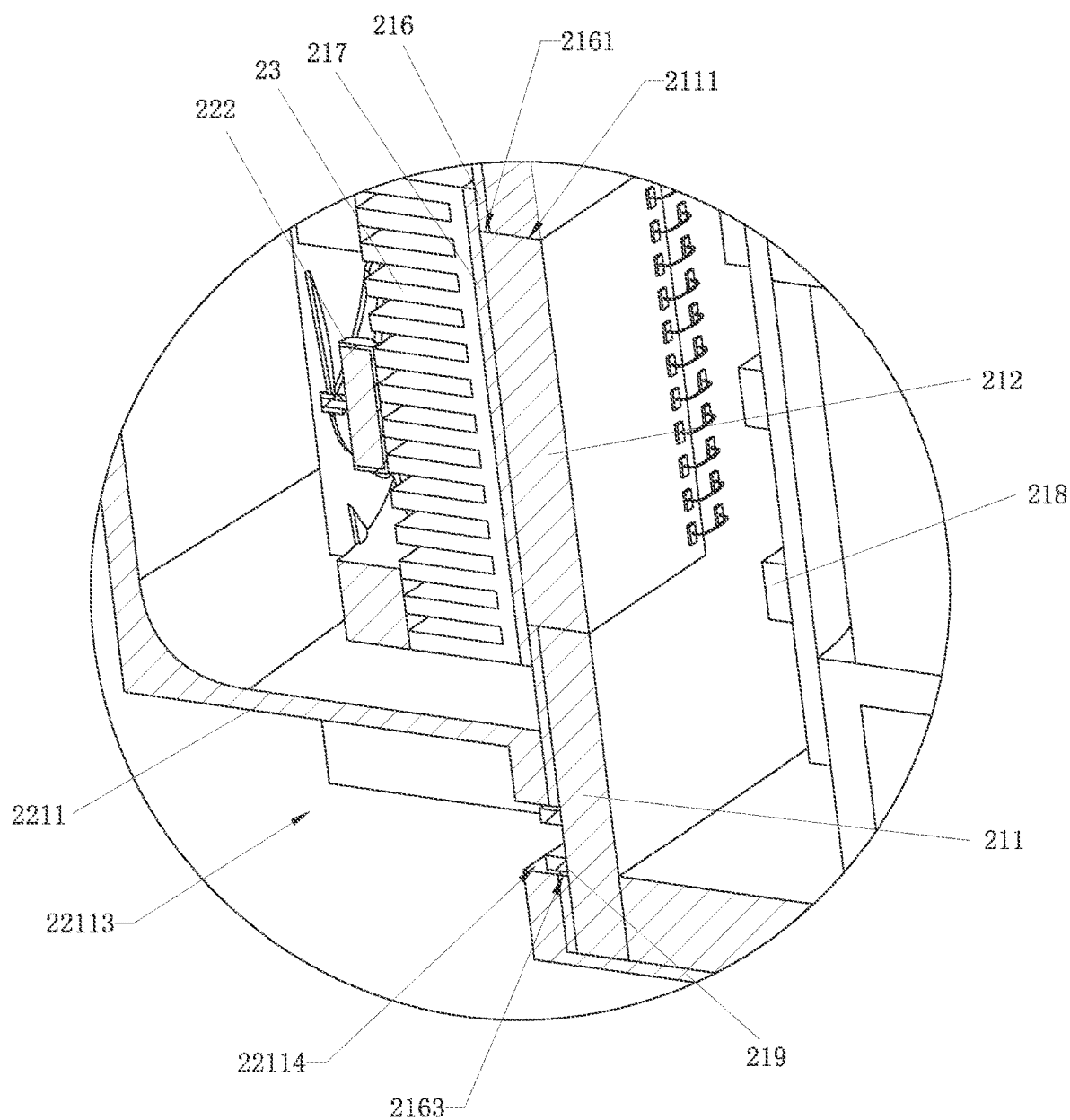
FIG. 6 is a partially enlarged view of FIG. 5.
Figure 7:
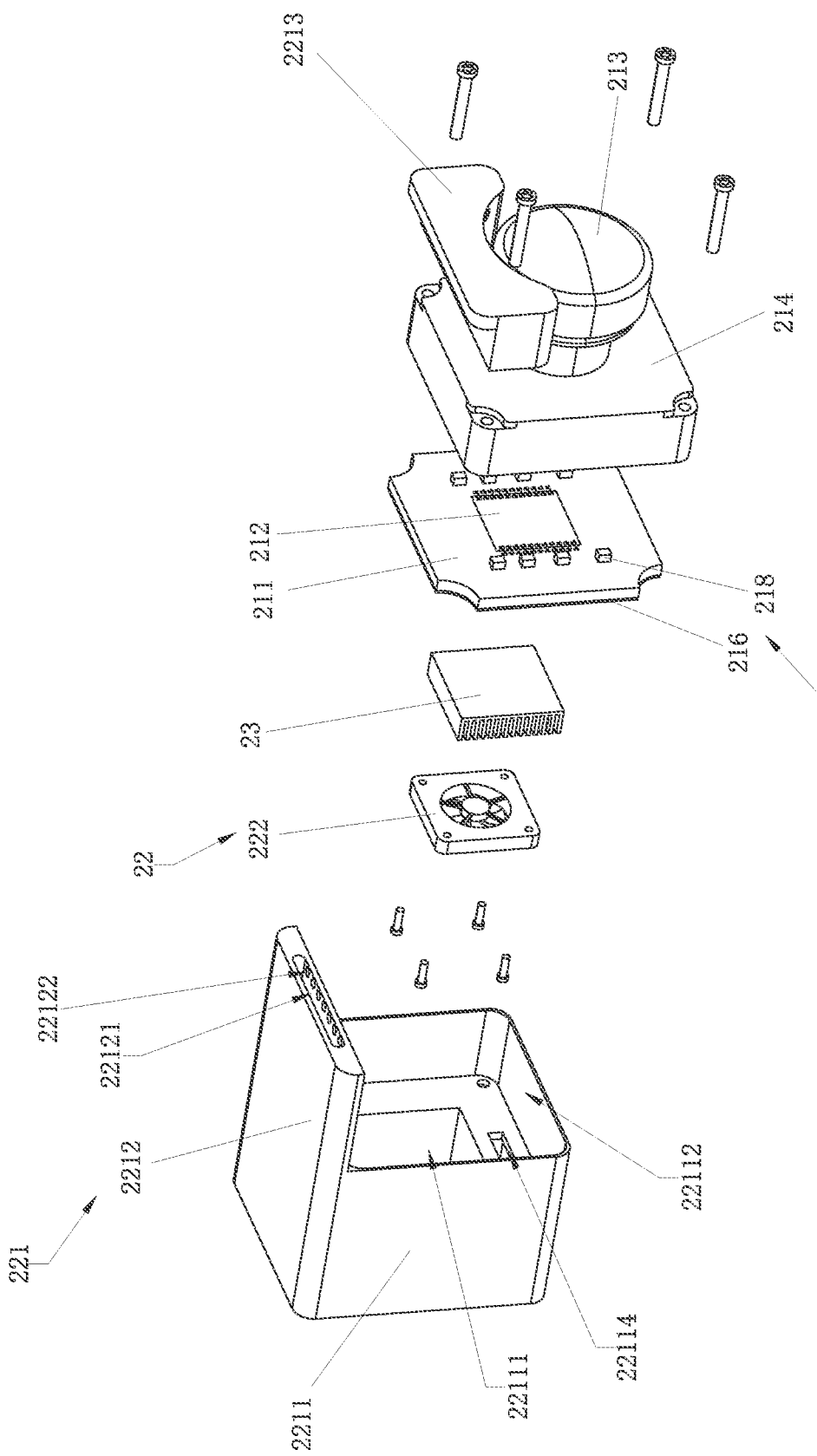
FIG. 7 is an exploded view of the camera of the vehicle with the image enhancement system according to an embodiment of the present disclosure.
Figure 8:
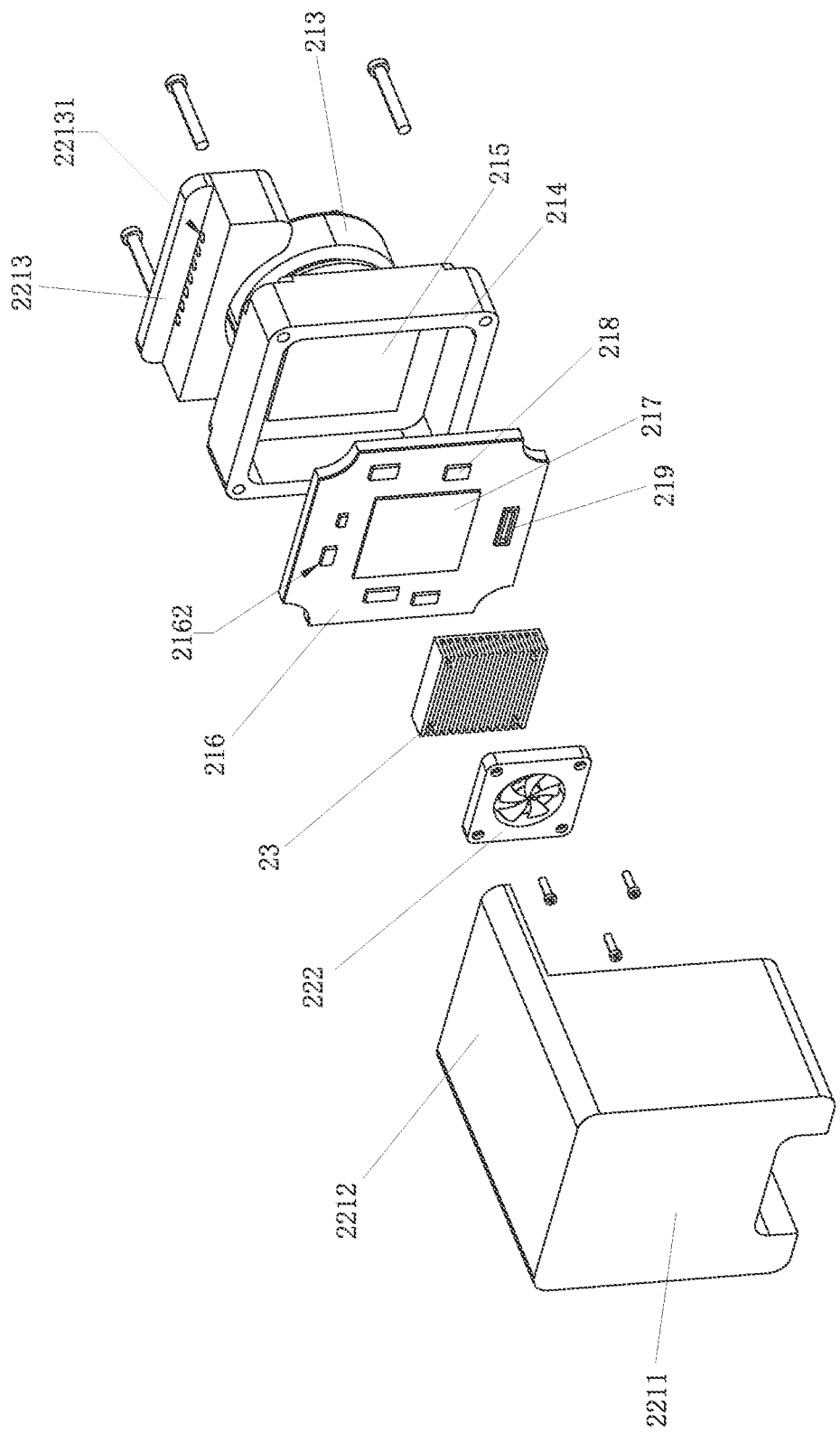
FIG. 8 is an exploded view of the camera of the vehicle with the image enhancement system according to an embodiment of the present disclosure from another perspective.

Referring to FIG. 1, the image enhancement system includes an acquiring unit 100, a training unit 200 and an enhancement unit 300. The acquiring unit 100, the training unit 200 and the enhancement unit 300 are communicatively connected to each other.

The acquiring unit 100 is configured to acquire an image captured by the cameras 20 of the vehicle. For illustration, the vehicle is defined as a first vehicle 2001 and a second vehicle 2002 depending on an application of the image captured by the cameras 20 in the image enhancement system. Therefore, the acquiring unit 100 is configured to acquire a first image of a driving environment captured by the cameras 20 of the first vehicle 2001 and a second image of the driving environment captured by the cameras 20 of the second vehicle 2002.

Specifically, the cameras 20 of the first vehicle 2001 continuously take the first image when the first vehicle 2001 is running. Then the first image is uploaded to the cloud 1000 through a communication device of the first vehicle 2001. The first image includes a road sign. Similarly, the cameras 20 of the second vehicle 2002 continuously take the second image when the second vehicle 2002 is running. Then the second image is uploaded to the cloud 1000 through a communication device of the second vehicle 2002. The second image includes a road sign.

The training unit 200 is configured to acquire a training image based on the first image, where the training image includes a first training image and a second training image, and an image quality of the second training image is lower than that of the first training image; configured to train a discriminative model in the GAN model by using the first training image and the second training image; and configured to train a generative model of the GAN model by using the second training image through a trained discriminative model to obtain an image enhancement model.

Specifically, the training unit includes a processing module 201, a discriminative model training module 202 and a generative model training module 203. The processing module 201, the discriminative model training module 202 and the generative model training module 203 are communicatively connected to each other, and the processing module 201 is communicatively connected to the acquiring unit 100.

The processing module 201 is configured to obtain the first image from the acquiring unit 100. In addition, the processing module 201 is configured to process the first image to obtain the first training image and the second training image.

In an embodiment, the first training image is captured in a well-lit environment, such as sunny day, by the cameras 20. The second training image is captured in a poorly-lit environment, such as night and rain and fog day, by the cameras 20. Thus, the first training image is superior to the second training image in terms of brightness, contrast, saturation, sharpness, smoothness, etc. Accordingly, the processing module 201 classifies the first image to obtain the first training image and the second training image.

In an embodiment, after the cameras 20 take the first image in a well-lit environment, the processing module 201 retains the first image to acquire the first training image and reduces an image quality of the first image to acquire the second training image. Thus, the first training image is superior to the second training image in terms of brightness, contrast, saturation, sharpness, smoothness, etc.

It should be noted that manner in which the processing module 201 reduces the image quality of the first image is not limited here. For example, the processing module 201 blurs (such as Gaussian Blur) the first image, adds noise to the first image or adds a mask to the first image to reduce the image quality of the first image to obtain the second training image.

The discriminative model training module 202 obtains the first training image and the second training image from the processing module 201 and trains the discriminative model by using the first training image and the second training image.

Specifically, the discriminative model training module 202 inputs the first training image and the second training image into a loss function of the discriminative model and trains the discriminative model by adjusting parameters in the loss function to reduce a loss function value to make the discriminant model more accurate.

It should be understood that, for the discriminative model has been trained, when the first training image having high image quality is input to the discriminative model, the discriminative model outputs the first training image with a probability of having high image quality approaches to 100%. Similarly, when the second training image having low image quality is input to the discriminative model, the discriminative model outputs the second training image with a probability of having high image quality approaches to 0%. In addition, the discriminative model outputs the first training image with a probability of having high image quality is closer to 100% after the first training image having high image quality is input to the discriminative model, also the discriminative model outputs the second training image with a probability of having high image quality is closer to 0% after the second training image having low image quality is input to the discriminative model, thus the more accurate the discriminative model is.

The generative model training module 203 is configured to train the generative model by using the second training image based on the trained discriminative model to obtain the image enhancement model. The enhancement unit 300 obtains the second image taken by the cameras 20 of the second vehicle 2002, and then enhances the second image after the second image is input into the image enhancement model to improve the image quality of the second image.

In an embodiment, the second vehicle 2002 is driven at night. Due to a poorly-lit environment, the second image captured by the cameras 20 of the second vehicle 2002 is lack of brightness, therefore affecting the image quality. The enhancement unit 300 can input the second image to the image enhancement model to improve a brightness of the second image, such that the image quality of the second image is improved.

In an embodiment, the second vehicle 2002 is driven in foggy day. Fog adheres to a surface of the cameras 20 of the second vehicle 2002, causing the second image captured by the cameras 20 of the second vehicle 2002 to be blurred, thus affecting image quality. The enhancement unit 300 can input the second image to the image enhancement model to improve a sharpness of the second image, such that the image quality of the second image is improved.

In an embodiment, the second vehicle 2002 is driven in rainy day. Water droplets adheres to the surface of the cameras 20 of the second vehicle 2002, causing the second image captured by the cameras 20 of the second vehicle 2002 to have dark spots. The enhancement unit 300 can input the second image to the image enhancement model to reduce the number and/or area of dark spots of the second image, such that the image quality of the second image is improved.

It should be noted that an improvement of the second image of the second vehicle 2002 is particularly important for self-driving and a safety and reliability of the self-driving.

In an embodiment, the generative model training module 203 includes an output sub-module 2031, a feature extraction sub-module 2032, a comparison sub-module 2033 and a training sub-module 2034. The output sub-module 2031, the feature extraction sub-module 2032, the comparison sub-module 2033 and the training sub-module 2034 are communicatively connected to each other.

The output sub-module 2031 is communicatively connected to the processing module 201 to acquire the second training image from the processing module 201. The output sub-module 2031 is configured to input the second training image to the generative model to output an output image.

The feature extraction sub-module 2032 is communicatively connected to the acquiring unit 100, the processing module 201 and the output sub-module 2031. The feature extraction sub-module 2032 acquires a desired image from the acquiring unit 100, the second training image from the processing module 201 and the output image from the output sub-module 2031, and extracts features of a specific area of the desired image, the second training image and the output image. For example, the desired image, the second training image and the output image all include road sign, therefore the feature extraction sub-module 2032 can extract a road sign feature in the desired image, the second training image and the output image. The desired image is a preset standard image that supports self-driving.

The comparison sub-module 2033 is communicatively connected to the feature extraction sub-module 2032. The comparison sub-module 2033 can obtain a brightness difference of a specific area in the second training image and in the output image, and a texture difference of the specific area in the desired image and in the output image. For example, the comparison sub-module 2033 compares a brightness of the road sign in the second training image and in the output image, and a texture of the road sign in the desired image and in the output image. The training sub-module 2034 trains the generative model according to the brightness difference and the texture difference to obtain the image enhancement model.

In an embodiment, the image enhancement model includes a communication unit 400 configured to establish a communication of the vehicle with the cloud 1000, such that the first image taken by the cameras 20 of the first vehicle 2001 is uploaded to the cloud 1000 via the communication unit 400. Similarly, the second image taken by the cameras 20 of the second vehicle 2002 is uploaded to the cloud 1000 via the communication unit 400. In this way, the image enhancement system can train the GAN and enhance the image captured by the cameras 20 of the vehicle at the cloud processor, enabling a training effect of the image enhancement model frees from hardware devices that the vehicle can carry, thereby facilitating a training of a more accurate image enhancement model.

In an embodiment, the image enhancement system further includes a control unit 500 configured to control an operating state of the cameras 20 of the second vehicle 2002 to remove adhesions, such as dust, fog and water droplets, on the surface of the cameras 20 of the second vehicle 2002, so as to improve image quality.

Referring to FIGS. 3-8, a specific structure of the cameras 20 is shown. The cameras 20 include a camera device 21 and a cleaning device 22. The camera device 21 and the cleaning device 22 are integrated so that the cameras 20 are integrated cameras. On one hand, the cleaning device 22 can clean dust, mist, water droplets, etc. adhering to a surface of the camera device 21 to improve image quality of images such as the first image of the first vehicle 2001 and the second image of the second vehicle 2002. On the other hand, the integration of the cleaning device 22 and the camera device 21 can improve a response speed of the cleaning device 22 and timely remove adhesion on the surface of the camera device 21, which are effective for the self-driving or driving safety of vehicles at high speeds.

Specifically, the camera device 21 includes a circuit board 211, an image sensor 212, a lens 213, and a base 214. The image sensor 212 is electrically connected to the circuit board 211. The base 214 is mounted to the circuit board 211. The lens 213 is arranged at the base 214. The base 214 is configured to keep the lens 213 at a light-sensitive path of the image sensor 212, such that an external light can reach the image sensor 212 after passing through the lens 213 and then form an image. In an embodiment, the lens 213 is a wide-angle lens to allow the camera device 21 to have a larger field of view. In an embodiment, the camera device 21 further includes a filter 215. The filter 215 is arranged between the lens 213 and the image sensor 212 to filter a specific type of light from a light passing through the lens 213. In an embodiment, the filter 215 is an infrared cutoff filter.

In an embodiment, the circuit board 211 is a printed circuit board (PCB) having great hardness and flatness, or a flexible printed circuit (FPC) which is thin. The image sensor 212 is electrically connected to the circuit board 211 by means of a gold wire. In order to further strengthen the hardness and flatness of the circuit board 211, the camera device 21 further includes a steel plate 216. The steel plate is mounted to a back side of the circuit board 211, that is, a side of the circuit board 211 away from the lens 213.

In an embodiment, the camera device 21 further includes a refrigeration chip 217. The image sensor 212 is mounted to a middle of a cold side of the refrigeration chip 217. The circuit board 211 has a first hole 2111. The steel plate 216 has a second hole 2161. The first hole 2111 is correspondingly communicated with the second hole 2161. An edge of the cold side of the refrigeration chip 217 is mounted to the steel plate 216 to stay a hot side of the refrigeration chip 217 away from the steel plate 216. The image sensor 212 is arranged at the first hole 2111 and the second hole 2161. On the one hand, since the cold side of the cooling chip 217 is ceramic having great flatness and the steel plate has great flatness, after the image sensor 212 is mounted to the middle of the cold side of the refrigeration chip 217 and the cold side of the refrigeration chip 217 is mounted to the steel plate 216, a flatness of the image sensor 212 can be ensured to ensure that the camera device 21 has a better imaging effect. On the other hand, the image sensor 212 is mounted to the refrigeration chip 217, such that heat generated by the image sensor 212 during photoelectric conversion can be directly absorbed by the refrigeration chip 217 to maintain an operating temperature of the image sensor 212, ensuring a stability of the camera device 21 during operation.

In an embodiment, a light-sensitive surface of the image sensor 212 is level with a front side of the circuit board 211 which is a side of the circuit board 211 close to the lens 213; or the light-sensitive surface of the image sensor 212 is protruded to front side of the circuit board 211 to reduce stray light and ensure the image quality of the cameras 20.

In addition, the camera device 21 further includes a series of electronic components 218 mounted to a surface of the circuit board 211. The electronic components 218 are selected from resistors, capacitors, processors, controllers, etc. to construct a logic circuit, such that an operating state of the image sensor 212 and that of the refrigeration chip 217 electrically connected to the circuit board 211 are controlled. In an embodiment, a part of the electronic component 218 is mounted to the front side of the circuit board 211, and another part of the electronic component 218 is mounted to the back side of the circuit board 211. In consequence, the circuit board 211 having small size is capable of being integrated with more of the electronic components 218 in favor of improving overall performance of the camera device 21 of the cameras 20. The steel plate 216 is provided with multiple first avoiding holes 2162 to avoid the electronic components 218 that are mounted on the back side of the circuit board 211, that is, the electronic components 218 are accommodated in the first avoiding holes 2162.

In addition, the camera device 21 further includes a connector 219 mounted to the back side of the circuit board 211 for connecting to the vehicle body 10. The steel plate 216 is provided with multiple second avoiding holes 2163 to avoid the connector 219 that are mounted on the back side of the circuit board 211, that is, the connector 219 is accommodated in the second avoiding holes 2163.

Referring to FIGS. 5-8, the cleaning device 22 includes a shell 221 and a fan 222. The shell 221 includes a shell body 2211 and an extension arm 2212 extending outwardly from the shell body 2211. The shell body 2211 includes an airflow generation space 22111 and an opening 22112 connected to the airflow generation space 22111. The camera device 21 is arranged on the opening 22112 with the lens 213 facing outward. The camera device 21 is configured to close the opening 22112. The fan 222 is hanged at the airflow generation space 22111 and arranged corresponding to the refrigeration chip 217. The extension arm 2212 is provided with an airflow passage 22121 and at least one air outlet 22122 connected to the airflow passage 22121. The airflow passage 22121 is connected to the airflow generation space 22111. The air outlet 22122 is arranged towards the lens 213. In an embodiment, the fan 222 is electrically connected to the circuit board 211.

When the fan 222 is energized and rotated, the fan 222 generates an airflow in the airflow generation space 22111. The airflow flows through the airflow passage 22121 and then vented through the air outlet 22122 to blow the lens 213, such that the dust, mist, water droplets, etc. adhering to a surface of the lens 213, so as to improvement image quality of the cameras 20. Due to a smaller size of the air outlet 22122 than a size of the airflow passage 22121, the airflow can be accelerated to form a high speed airflow when the airflow exits is vented through the air outlet 22122, so as to improve a blowing effect for dust, mist, and water droplets adhering to the surface of the lens 213.

When the cameras 20 are arranged on the vehicle body 10, the extension arm 2212 is located above the lens 213, such that the airflow blows the lens 213 from top to bottom to improve the blowing effect for dust, mist, and water droplets adhering to the surface of the lens 213.

Referring to FIGS. 5-8, the shell 221 further includes a guiding part 2213. The guiding part 2213 includes at least one guiding passage 22131. The guiding part 2213 is arranged at an end of the extension arm 2212. The guiding passage 22131 is connected to the air outlet 22122. The guiding passage 22131 is close to and faced towards the surface of the lens 213, such that the airflow vented through the air outlet 22122 is guided to the surface of the lens 213 by the guiding passage 22131.

It should be noted that the manner in which the guiding part 2213 is arranged at the end of the extension arm 2212 is not limited. For example, the guiding part 2213 is arranged at the end of the extension arm 2212 by using a screw; or the guiding part 2213 is glued to the end of the extension arm 2212 by using glue.

The lens 213 is a wide-angle lens with an outer side thereof bulging outwardly. In order to further improve the blowing effect for dust, mist, and water droplets adhering to the surface of the lens 213, the guiding passage 22131 is extendedly arranged at an angle.

In an embodiment, the shell body 2211 includes a notch 22113 and an inserting passage 22114. The notch 22113 is formed by indenting an outer surface of the shell body 2211. The inserting passage 22114 is connected to the airflow generation space 22111 and the notch 22213. The connector 219 of the camera device 21 is extended to the inserting passage 22114. Therefore, it is convenient to install the cameras 20 on the vehicle body 10, also can improve a sealing effect of the cameras 20.

Referring to FIGS. 5-8, the cameras 20 further include a thermal conductivity device 23 mounted to the hot side of the refrigeration chip 217. The fan 222 is mounted at the thermal conductivity device 23. Therefore, when the camera device 21 is mounted at the opening 22112 of the shell body 2211, the fan 222 is hanged at the airflow generation space 22111. Also, the thermal conductivity device 23 can quickly radiate heat generated by the image sensor 212 during operation to the airflow generation space 22111 to warm up the airflow, such that when the airflow is vented through the guiding passage 22131 to blow the lens 213, the dust, mist, and water droplets adhering to the surface of the lens 213 are blown off and the surface of the lens 213 is dried to improve the cleaning effect.

Since the airflow can be warmed up by the heat generated by the mage sensor 21 during operation, the cameras 20 do not need a heat source to create a hotter airflow to blow the surface of the lens 213, such that an overall structure of the cameras 20 is simplified and the reliability of the cameras 20 is improved.

Referring to FIG. 9, this applicant provides an image enhancement method based on a GAN model, which is performed as follows.

(a) The first image of the driving environment captured by the cameras 20 of the first vehicle 2001 is acquired.

(b) The training image based on the first image is acquired. The training image includes a first training image and a second training image, and an image quality of the second training image is lower than that of the first training image.

(c) The discriminative model in the GAN model is trained using the first training image and the second training image.

(d) The generative model of the GAN model is trained using the second training image based on a trained discriminative model to obtain an image enhancement model.

(e) The second image of the driving environment captured by the cameras 20 of the second vehicle 2002 is acquired.

(f) The second image is input into the image enhancement model to improve the image quality of the second image.

It should be understood that the features of various implementing embodiments may be combined to form further embodiments of the disclosed concepts.

Described above are merely illustrative of the disclosure, and are not intended to limit the disclosure. Those modifications and variations made by those skilled in the art based on the content disclosed herein without departing from the scope of the disclosure shall fall within the scope of the present disclosure defined by the appended claims.

What is claimed is:

1. An image enhancement system based on a generative adversarial network (GAN) model, comprising:
an acquiring unit;
a training unit; and
an enhancement unit;
wherein the acquiring unit is configured to acquire a first image of a driving environment captured by a camera of a first vehicle and a second image of the driving environment captured by a camera of a second vehicle;
the training unit is configured to acquire a training image based on the first image, wherein the training image comprises a first training image and a second training image, and an image quality of the second training image is lower than that of the first training image; configured to train a discriminative model in the GAN model by using the first training image and the second training image; and configured to train a generative model of the GAN model by using the second training image through a trained discriminative model to obtain an image enhancement model;
the enhancement unit is configured to enhance the second image by inputting the second image into the image enhancement model, so as to improve an image quality of the second image;
wherein the training unit comprises a processing module, a discriminative model training module and a generative model training module;
the processing module is configured to process the first image to obtain the first training image and the second training image;
the discriminative model training module is configured to train the discriminative model by using the first training image and the second training image;
the generative model training module is configured to train the generative model by using the second training image based on the trained discriminative model to obtain the image enhancement model;
wherein the generative model training module comprises an output sub-module, a feature extraction sub-module, a comparison sub-module and a training sub-module;
the output sub-module is configured to output an output image after the second training image is input into the generative model;
the feature extraction sub-module is configured to extract a feature from feature areas of a desired image, the second training image and the output image;
the comparison sub-module is configured to obtain a brightness difference of a specific area between the second training image and the output image, and obtain a texture difference of the specific area between the desired image and the output image; and
the training sub-module is configured to train the generative model according to the brightness difference and the texture difference.

2. The image enhancement system of claim 1, wherein the processing module is configured to classify the first image to obtain the first training image and the second training image.

3. The image enhancement system of claim 1, wherein the processing module is configured to retain the first image to acquire the first training image and reduce an image quality of the first image to acquire the second training image.

4. The image enhancement system of claim 1, wherein the specific area is an area corresponding to a road sign.

5. An image enhancement method based on a GAN model, comprising:
(a) acquiring a first image of a driving environment captured by a camera of a first vehicle;
(b) acquiring a training image based on the first image, wherein the training image comprises a first training image and a second training image, and an image quality of the second training image is lower than that of the first training image;
(c) training a discriminative model in the GAN model using the first training image and the second training image;
(d) training a generative model of the GAN model using the second training image based on a trained discriminative model to obtain an image enhancement model;
(e) acquiring a second image of the driving environment captured by a camera of a second vehicle; and
(f) inputting the second image into the image enhancement model to improve an image quality of the second image;
wherein the step (d) is performed through steps of:
(d.1) acquiring a desired image;
(d.2) inputting the second training image into the generative model of the GAN model to obtain an output image;
(d.3) obtaining a brightness difference of a specific area between the second training image and the output image;
(d.4) obtaining a texture difference of the specific area between the desired image and the output image; and
(d.5) training the generative model according to the brightness difference and the texture difference.

6. The image enhancement method of claim 5, wherein in the step (b), the first training image and the second training image are acquired by classifying the first image.

7. The image enhancement method of claim 5, wherein in the step (b), the first training image is acquired by retaining the first image; and the second training image is acquired by reducing an image quality of the first image.

8. The image enhancement method of claim 5, wherein the GAN model is trained by a cloud processor to obtain the image enhancement model.

9. The image enhancement method of claim 5, wherein the specific area is an area corresponding to a road sign.

* * * * *